(12) United States Patent
Ohtomo et al.

(10) Patent No.: US 12,077,705 B2
(45) Date of Patent: Sep. 3, 2024

(54) LIQUID CRYSTAL POLYESTER AND FILM COMPRISING THE SAME

(71) Applicant: SUMITOMO CHEMICAL COMPANY, LIMITED, Tokyo (JP)

(72) Inventors: Shinji Ohtomo, Ibaraki (JP); Shohei Azami, Ibaraki (JP); Monami Tosa, Ibaraki (JP); Nozomi Masui, Ibaraki (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/181,288

(22) Filed: Mar. 9, 2023

(65) Prior Publication Data

US 2023/0295512 A1 Sep. 21, 2023

(30) Foreign Application Priority Data

Mar. 16, 2022 (JP) .................... 2022-041382
Jul. 29, 2022 (JP) .................... 2022-122145

(51) Int. Cl.
*C09K 19/38* (2006.01)

(52) U.S. Cl.
CPC ...... *C09K 19/3809* (2013.01); *C09K 2219/03* (2013.01); *C09K 2219/13* (2013.01)

(58) Field of Classification Search
CPC ............ C09K 19/3809; C09K 2219/03; C09K 2219/13

(Continued)

(56) References Cited

U.S. PATENT DOCUMENTS 6,046,300 A 4/2000 Umetsu et al.
6,774,203 B1 8/2004 Fukute
(Continued)

FOREIGN PATENT DOCUMENTS

CN 104017194 A 9/2014
CN 112225884 A 1/2021
(Continued)

OTHER PUBLICATIONS

Japanese Notice of Reason for Refusal issued in corresponding Japanese Patent Application No. 2022-041382, dated Jun. 21, 2022, with English translation.
(Continued)

*Primary Examiner* — Ruiyun Zhang
(74) *Attorney, Agent, or Firm* — Foley & Lardner LLP

(57) ABSTRACT

A liquid crystal polyester comprising a repeating unit derived from an aromatic hydroxycarboxylic acid. The content of the repeating unit derived from an aromatic hydroxycarboxylic acid is 80% or more based on 100% of a total number of all repeating units of the liquid crystal polyester. The repeating unit derived from an aromatic hydroxycarboxylic acid comprises a repeating unit (A1) represented by the formula (A1) and a repeating unit (A2) represented by the formula (A2). A ratio [repeating unit (A2)/repeating unit (A1)] is 1.2 or larger. A molar ratio [phenolic hydroxyl groups/(the phenolic hydroxyl groups+acyl groups)] is 0.3 or lower, as calculated by $^1$H-NMR.

—O—$Ar^{11}$—CO— (A1)

—O—$Ar^{12}$—CO— (A1)

$Ar^{11}$ represents a phenylene group and $Ar^{12}$ represents a naphthylene group. A hydrogen atom is optionally substituted.

19 Claims, 1 Drawing Sheet

(58) Field of Classification Search
USPC .................................................. 252/299.01
See application file for complete search history.

(56) References Cited

U.S. PATENT DOCUMENTS

2007/0293633 A1    12/2007   Hosoda et al.
2022/0282085 A1*    9/2022   Tamura ................ C08G 63/183

FOREIGN PATENT DOCUMENTS

| JP | 06-157733 A   | 6/1994  |
| JP | 2003-206342 A | 7/2003  |
| JP | 2004-250620 A | 9/2004  |
| JP | 2006-001990 A | 1/2006  |
| JP | 2006-225642 A | 8/2006  |
| JP | 2008-019428 A | 1/2008  |
| JP | 2010-174207 A | 8/2010  |
| JP | 2012-214737 A | 11/2012 |
| JP | 2015-196794 A | 11/2015 |

OTHER PUBLICATIONS

Japanese Notice of Reason for Refusal issued in corresponding Japanese Patent Application No. 2022-122145, dated Sep. 6, 2022, with English translation.
Japanese Decision to Grant a Patent issued in corresponding Japanese Patent Application No. 2022-122145, dated Jan. 4, 2023, with English translation.

* cited by examiner

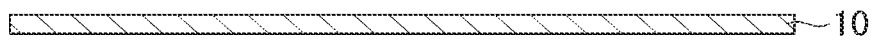

LIQUID CRYSTAL POLYESTER AND FILM COMPRISING THE SAME

TECHNICAL FIELD

This application is related to a liquid crystal polyester, a process for producing a liquid crystal polyester, a liquid crystal polyester composition, a film, a process for producing a film, and a circuit board.

CROSS-REFERENCE TO RELATED APPLICATIONS

Priority is claimed on Japanese Patent Application No. 2022-41382, filed Mar. 16, 2022 and Japanese Patent Application No. 2022-122145, filed Jul. 29, 2022, the contents of which are incorporated herein by reference.

BACKGROUND ART

Liquid crystal polyesters have been known to be high in chemical stability, heat resistance and dimensional accuracy, and are utilized in various fields such as electric, electronic, mechanical and optical devices, automobiles, airplanes and medical fields.

Among these fields, in particular, liquid crystal polyesters, because of having excellent high-frequency characteristics and low water absorbency, are drawing attention as materials for electronic parts.

Since liquid crystal polyesters, as compared with other thermoplastic resins, have a rigid molecular structure and a low dipole-property and the molecular structure of liquid crystal polyesters hardly move even in application of an electric field, they have excellent dielectric loss tangent at high frequencies.

Since liquid crystal polyesters have high heat resistance, they are also thermally stable in the relative dielectric constant and the dielectric loss tangent. Since liquid crystal polyesters have low water absorbency, they exhibit almost no change in the relative dielectric constant and the dielectric loss tangent by water absorption. Since liquid crystal polyesters have high flowability, they are excellent in fabrication of thin and small molded articles.

For example, JP 2004-250620 A discloses a liquid crystalline aromatic polyester for insulating materials, consisting of (i) a repeating unit or units derived from p-hydroxybenzoic acid and (ii) a repeating unit or units derived from one or more hydroxynaphthoic acid(s), wherein the content ratio of (i) is 5 to 65 mol % based on a total number of moles of (i) and (ii).

The liquid crystalline aromatic polyester for insulating materials in JP 2004-250620 A is disclosed as one having a low dielectric loss tangent in a high-frequency region.

SUMMARY

The present disclosure includes the following embodiments.

[1] A liquid crystal polyester comprising a repeating unit derived from an aromatic hydroxycarboxylic acid,
wherein the content of the repeating unit derived from an aromatic hydroxycarboxylic acid is 80% or more based on 100% of a total number of all repeating units of the liquid crystal polyester,
the repeating unit derived from an aromatic hydroxycarboxylic acid comprises a repeating unit (A1) represented by the formula (A1) and a repeating unit (A2) represented by the formula (A2),
a ratio between the number of the repeating unit (A1) and the number of the repeating unit (A2) [repeating unit (A2)/repeating unit (A1)] is 1.2 or larger and
a molar ratio of phenolic hydroxyl groups to the total amount of the phenolic hydroxyl groups and acyl groups [phenolic hydroxyl groups/(the phenolic hydroxyl groups+acyl groups)] is 0.3 or lower, as calculated by $^1$H-NMR,

(A1)

(A2)

wherein $Ar^{11}$ represents a phenylene group, and a hydrogen atom in the phenylene group in $Ar^{11}$ is optionally substituted by a halogen atom, an alkyl group or an aryl group; and $Ar^{12}$ represents a naphthylene group, and a hydrogen atom in the naphthylene group in $Ar^{12}$ is optionally substituted by a halogen atom, an alkyl group or an aryl group.

[2] The liquid crystal polyester according to [1] or [2], wherein $Ar^{11}$ in the formula (A1) is a 1,4-phenylene group, and $Ar^{12}$ in the formula (A2) is a 2,6-naphthylene group.

[3] The liquid crystal polyester according to [1] or [2], wherein the liquid crystal polyester has a weight-average molecular weight of 100,000 to 800,000.

[4] The liquid crystal polyester according to any one of [1] to [3], wherein the liquid crystal polyester has a degree of dispersion of 2.0 to 6.0.

[5] A liquid crystal polyester composition comprising the liquid crystal polyester according to any one of [1] to [4] and a solvent.

[6] A film comprising the liquid crystal polyester according to any one of [1] to [4].

[7] A process for producing a film comprising a step of melt forming the liquid crystal polyester according to any one of [1] to [4] to produce the film.

[8] The process for producing a film according to [7], wherein an inflation method or a T die method is used in the step of melt forming to produce the film.

[9] A circuit board comprising the film according to [6].

BRIEF DESCRIPTION OF DRAWING

FIG. 1 schematically shows an example of a view of a film of the present disclosure.

DETAILED DESCRIPTION

According to the present disclosure, a liquid crystal polyester of which heat resistance is more enhanced can be provided.

According to the present disclosure, a process for producing the liquid crystal polyester, a liquid crystal polyester composition comprising the liquid crystal polyester, a film comprising the liquid crystal polyester, a process for producing the film and a circuit board comprising the film can be provided.

(Liquid Crystal Polyester)

In a liquid crystal polyester of one embodiment, a molar ratio of phenolic hydroxyl groups to the total amount of the phenolic hydroxyl groups and acyl groups [phenolic hydroxyl groups/(the phenolic hydroxyl groups+acyl groups)] (hereinafter, also referred to as "Ratio A") is 0.3 or low, as calculated by $^1$H-NMR.

The liquid crystal polyester of one embodiment has a repeating unit derived from an aromatic compound being a raw material monomer. The aromatic compound has a hydroxyl group (phenolic hydroxyl group) on an aromatic ring. Further, the liquid crystal polyester of one embodiment has a repeating unit derived from an aromatic compound in which the hydrogen atom of the phenolic hydroxyl group is substituted by an acyl group.

The liquid crystal polyester of one embodiment typically has phenolic hydroxyl groups and acyl groups on main-chain terminals.

In the present specification, "derived from" means that the chemical structures change for polymerization of the raw material monomer and no other chemical structures change.

Ratio A is 0.3 or lower, preferably 0.28 or lower, more preferably 0.26 or lower and still more preferably 0.24 or lower.

Since Ratio A is 0.3 or lower, the heat resistance of the liquid crystal polyester is improved. Since the ratio is above preferable value or lower, the heat resistance of the liquid crystal polyester is more improved.

Ratio A is preferably 0.01 or larger, more preferably 0.03 or larger and still more preferably 0.05 or larger.

For example, Ratio A is preferably 0.01 or larger and 0.3 or lower, more preferably 0.03 or larger and 0.28 or lower, still more preferably 0.05 or larger and 0.26 or lower and especially preferably 0.05 or larger and 0.24 or lower.

Ratio A may also be 0.05 or larger and 0.15 or lower.

Ratio A is calculated by $^1$H-NMR measurement. The specific calculation method is as follows.

(i) In a $^1$H-NMR spectrum, a peak area A assigned to hydrogen atoms derived from the acyl group of a liquid crystal polyester is calculated. Here, the "hydrogen atoms derived from the acyl group" means "hydrogen atoms bound to the carbon atom adjacent to the carbon atom of the carbonyl group of the acyl group in the acyl group" (α-hydrogen).

(ii) By dividing the peak area A by the number of the hydrogen atoms per repeating unit having the acyl group, a relative amount of substance (IntAc) of the acyl groups is calculated.

(iii) In the same $^1$H-NMR spectrum as the spectrum used in (i), a peak area B assigned to hydrogen atoms on carbon atoms adjacent to the carbon atom bound to the phenolic hydroxyl group of the liquid crystal polyester is calculated.

(iv) By dividing the peak area B by the number of the hydrogen atoms per repeating unit having the phenolic hydroxyl group, a relative amount of substance (IntOH) of the phenolic hydroxyl groups can be calculated.

(v) Ratio A can be calculated by (IntOH)/[(IntOH)+(IntAc)] using (IntAc) calculated in (ii) and (IntOH) calculated in (iv).

Measuring solvents in the $^1$H-NMR measurement are good enough as long as they allow the $^1$H-NMR measurement and are capable of dissolving the liquid crystal polyester, and suitably deuterated pentafluorophenol and deuterated 1,1,2,2-tetrachloroethane.

A measuring apparatus and the measurement condition of $^1$H-NMR in the case of using deuterated pentafluorophenol and deuterated 1,1,2,2-tetrachloroethane as measuring solvents includes the followings.

NMR apparatus: AVANCE III, manufactured by Bruker Corp.
Magnetic field strength: 14.1 T
Probe: TCI CryoProbe A sample solution for measurement is prepared by adding 0.5 mL of deuterated pentafluorophenol to 10 mg of a sample, dissolving the sample at 100° C. for 2 hours, and further adding and mixing 0.3 mL of deuterated 1,1,2,2-tetrachloroethane. The NMR measurement is carried out under the following condition.

Measurement method: $^1$H-1D (presaturation method)
Measurement temperature: 30° C.
Number of scans: 64
Waiting time: 4 s The flow starting temperature of the liquid crystal polyester of the one embodiment is preferably 250° C. or larger, more preferably 270° C. or larger and still more preferably 280° C. or larger.

The flow starting temperature of the liquid crystal polyester of one embodiment is preferably 400° C. or lower, more preferably 360° C. or lower and still more preferably 320° C. or lower.

For example, the flow starting temperature of the liquid crystal polyester of one embodiment is preferably 250° C. or larger and 400° C. or lower, more preferably 270° C. or larger and 360° C. or lower and still more preferably 280° C. or larger and 320° C. or lower.

In the present specification, the flow starting temperature is also referred as flow temperature or flow start temperature, and is a temperature to become a guide of a molecular weight of the liquid crystal polyester (see "Liquid Crystal Polymer—Synthesis, Molding, Application—", edited by Naoyuki Koide, CMC Publishing Co., Ltd., Jun. 5, 1987, p. 95).

The flow starting temperature is a temperature wherein a viscosity of a liquid crystal polyester shows 4,800 Pas (48,000 poises) when a liquid crystal polyester is melted while raising the temperature at a rate of 4° C./min under a load of 9.8 MPa (100 kg/cm$^2$) using a flow tester and extruded from a nozzle having an inner diameter of 1 mm and a length of 10 mm.

The liquid crystal polyester of one embodiment comprises a repeating unit derived from an aromatic hydroxycarboxylic acid.

The content of the repeating unit derived from an aromatic hydroxycarboxylic acid is 80% or more, more preferably 90% or more and may be 100% based on 100% of a total number of all repeating units of the liquid crystal polyester.

When the content of the repeating unit derived from an aromatic hydroxycarboxylic acid is in the above preferable value or more, the heat resistance of the liquid crystal polyester of one embodiment is more improved.

"Repeating unit derived from an aromatic hydroxycarboxylic acid" comprises not only the repeating unit derived from an aromatic hydroxycarboxylic acid but also a repeating unit derived from an acylated product obtained by subjecting an aromatic hydroxycarboxylic acid and a fatty acid anhydride to acylation.

In the present specification, the number of the repeating units can be calculated, for example, according to the analysis method disclosed in JP 2000-19168 A.

Specifically, the number of each repeating unit can be calculated by reacting a liquid crystal polyester with a lower alcohol having 1 to 3 carbon atoms in a supercritical state to depolymerize the liquid crystal polyester to monomers from which repeating units are derived, and quantitatively determining, by liquid chromatography, each monomer which is obtained as a depolymerization product and from which the each repeating unit is derived.

The repeating unit derived from an aromatic hydroxycarboxylic acid comprises a repeating unit (A1) represented by the formula (A1) (hereinafter, referred to also as "repeating unit (A1)") and a repeating unit (A2) represented by the formula (A2) (hereinafter, referred to also as "repeating unit (A2)"):

—O—Ar$^{11}$—CO—  (A1)

—O—Ar$^{12}$—CO—  (A2)

wherein Ar$^{11}$ represents a phenylene group, and a hydrogen atom of the phenylene group in Ar$^{11}$ is optionally substituted by a halogen atom, an alkyl group or an aryl group; and Ar$^{12}$ represents a naphthylene group, and a hydrogen atom in the naphthylene group in Ar$^{12}$ is optionally substituted by a halogen atom, an alkyl group or an aryl group.

In the formula (A1), Ar$^{11}$ is a phenylene group, and is preferably a 1,4-phenylene group. That is, the repeating unit (A1) is preferably a repeating unit derived from p-hydroxybenzoic acid and a compound made by acylating a phenolic hydroxyl group of p-hydroxybenzoic acid.

In the formula (A1), a hydrogen atom of the phenylene group in Ar$^{11}$ is optionally substituted by a halogen atom, an alkyl group or an aryl group.

The halogen atom includes a fluorine atom, a chlorine atom, a bromine atom and an iodine atom.

The alkyl group includes a methyl group, an ethyl group, an n-propyl group, an isopropyl group, an n-butyl group, an isobutyl group, a s-butyl group, a t-butyl group, an n-hexyl group, a 2-ethylhexyl group, an n-octyl group and an n-decyl group, and the number of carbon atoms thereof is preferably 1 to 10.

The aryl group includes a phenyl group, an o-tolyl group, an m-tolyl group and a p-tolyl group, a 1-naphthyl group and 2-naphthyl group, and the number of carbon atoms thereof is preferably 6 to 20.

It is preferable that the phenylene group in Ar$^{11}$ is not substituted.

In the formula (A2), Ar$^{12}$ is a naphthylene group, and is, from the viewpoint of electric characteristics, preferably a 2,6-naphthylene group. That is, the repeating unit (A2) is preferably a repeating unit derived from 6-hydroxy-2-naphthoic acid and a compound made by acylating a phenolic hydroxyl group of 6-hydroxy-2-naphthoic acid.

In the formula (A2), a hydrogen atom of the naphthylene group in Ar$^{12}$ is optionally substituted by a halogen atom, an alkyl group or an aryl group. The halogen atom, the alkyl group and the aryl group specifically include the same halogen atoms and substituents as the halogen atoms, the alkyl groups and the aryl groups as the above-mentioned substituents in Ar$^{11}$.

It is preferable that the liquid crystal polyester of one embodiment consists of the repeating unit (A1) and the repeating unit (A2) from the viewpoint of the heat resistance of the liquid crystal polyester.

The number of the repeating units (A1) is preferably 10% or more, more preferably 15% or more and still more preferably 20% or more based on 100% of a total number of all repeating units of the liquid crystal polyester.

The number of the repeating units (A1) is preferably 45% or less, more preferably 42% or less, still more preferably less than 42%, especially preferably 40% or less and most preferably 33% or less based on 100% of a total number of all repeating units of the liquid crystal polyester.

When the number of the repeating units (A1) is within the above preferable range, the heat resistance of the liquid crystal polyester of one embodiment is more improved.

For example, the number of the repeating units (A1) is preferably 10% or more and 45% or less, more preferably 15% or more and 42% or less, still more preferably 15% or more and less than 42%, especially preferably 20% or more and 40% or less and most preferably 20% or more and 33% or less based on 100% of a total number of all repeating units of the liquid crystal polyester.

The number of the repeating units (A2) in the liquid crystal polyester of one embodiment is preferably 40% or more, more preferably 50% or more, still more preferably more than 50%, even still more preferably 52% or more, even still more preferably 55% or more, especially preferably 58% or more and most preferably 60% or more, and may be 67% or more based on 100% of a total number of all repeating units of the liquid crystal polyester.

The number of the repeating units (A2) is preferably 90% or less, more preferably 85% or less and still more preferably 80% or less based on 100% of a total number of all repeating units of the liquid crystal polyester.

When the number of the repeating units (A2) is within the above preferable range, the heat resistance of the liquid crystal polyester of one embodiment is more improved.

For example, the number of the repeating units (A2) is preferably 40% or more and 90% or less, more preferably 50% or more and 85% or less, still more preferably more than 50% and 85% or less, even still more preferably 52% or more and 85% or less, even still more preferably 55% or more and 85% or less, especially preferably 58% or more and 80% or less and most preferably 60% or more and 80% or less based on 100% of a total number of all repeating units of the liquid crystal polyester.

The ratio between the number of the repeating units (A1) and the number of the repeating units (A2) [repeating unit (A2)/repeating unit (A1)] (hereinafter, also referred to as "Ratio B") is 1.2 or larger, preferably 1.3 or larger and more preferably 1.4 or larger.

Ratio B is preferably 5 or lower, more preferably 4 or lower and still more preferably 3.5 or lower.

When Ratio B is within the above preferable range, the heat resistance of the liquid crystal polyester of one embodiment is more improved.

For example, Ratio B is preferably 1.2 or larger and 5 or lower, more preferably 1.3 or larger and 4 or lower and still more preferably 1.4 or larger and 3.5 or lower.

The weight-average molecular weight (Mw) of the liquid crystal polyester of one embodiment is preferably 100,000 or higher, more preferably 110,000 or higher and still more preferably 600,000 or higher.

The weight-average molecular weight (Mw) of the liquid crystal polyester of one embodiment is preferably 800,000 or lower, more preferably 750,000 or lower and still more preferably 700,000 or lower.

When the weight-average molecular weight (Mw) is within the above preferable range, the heat resistance of the liquid crystal polyester of one embodiment is more improved.

For example, the weight-average molecular weight (Mw) is preferably 100,000 to 800,000, more preferably 110,000 to 750,000 and still more preferably 600,000 to 700,000.

The number-average molecular weight (Mn) of the liquid crystal polyester of one embodiment is preferably 10,000 or higher, more preferably 30,000 or higher and still more preferably 150,000 or higher.

The number-average molecular weight (Mn) of the liquid crystal polyester of one embodiment is preferably 800,000 or lower, more preferably 750,000 or lower and still more preferably 700,000 or lower.

When the number-average molecular weight (Mn) is within the above preferable range, the heat resistance of the liquid crystal polyester of one embodiment is more improved.

For example, the number-average molecular weight (Mn) is preferably 10,000 to 300,000, more preferably 30,000 to 250,000 and still more preferably 150,000 to 200,000.

The degree of dispersion (Mw/Mn) of the liquid crystal polyester of one embodiment is preferably 2.0 to 6.0, more preferably 3.0 to 5.0 and still more preferably 3.5 to 4.0.

In the present specification, the weight-average molecular weight (Mw) and the number-average molecular weight (Mn) can be calculated, for example, by gel permeation chromatography (GPC), and means values calculated in terms of standard polystyrenes based on a calibration curve obtained by measurement of the molecular weights of the standard polystyrenes.

The liquid crystal polyester of one embodiment is typically a liquid crystal polyester having a repeating unit derived from 6-hydroxy-2-naphthoic acid and a repeating unit derived from p-hydroxybenzoic acid, wherein parts of phenolic hydroxyl groups on main-chain terminals of the repeating unit derived from 6-hydroxy-2-naphthoic acid and/or the repeating unit derived from p-hydroxybenzoic acid are substituted by acyl groups (preferably, acetyl groups).

The liquid crystal polyester of one embodiment may be a liquid crystal polyester resin mixture in which two or more types of liquid crystal polyesters are mixed, and may be, for example, a mixture of liquid crystal polyester resins having mutually different flow starting temperatures.

In the liquid crystal polyester of one embodiment, Ratio A is 0.3 or lower. That is, acyl groups, which are probably thermally more stable than the phenolic hydroxyl groups, are more than the phenolic hydroxyl groups. Hence, it is presumed that such a situation hardly occurs that, for example, when the liquid crystal polyester is heated, the main-chain terminals are broken and the broken moieties end in turning to gasses.

Therefore, it is presumed that the heat resistance of the liquid crystal polyester of one embodiment is enhanced.

(Process for Producing the Liquid Crystal Polyester)

A process for producing the liquid crystal polyester of one embodiment comprises the following step (i) and the following step (ii).

[Step (i)]

The step (i) is a step of subjecting an aromatic hydroxycarboxylic acid and a fatty acid anhydride to an acylation reaction to obtain an acylated product.

For example, when the aromatic hydroxycarboxylic acid is p-hydroxybenzoic acid and the fatty acid anhydride is acetic anhydride, the hydrogen atom of the phenolic hydroxyl group of the p-hydroxybenzoic acid is substituted by an acetyl group of the acetic anhydride to form an acylated product.

Acetic acid is generated as a by-product from a hydrogen ion (H$^+$) of the phenolic hydroxyl group of p-hydroxybenzoic acid, and an anion (CH$_3$COO$^-$) formed from an acetyloxy group of the acetic anhydride.

The aromatic hydroxycarboxylic acid in the step (i) includes an aromatic hydroxycarboxylic acid represented by the formula (A01) (hereinafter, referred to also as "aromatic hydroxycarboxylic acid (A01)"), and an aromatic hydroxycarboxylic acid represented by the formula (A02) (hereinafter, referred to also as "aromatic hydroxycarboxylic acid (A02)").

wherein Ar$^{11}$ represents a phenylene group, and a hydrogen atom of the phenylene group in Ar$^{11}$ is optionally substituted by a halogen atom, an alkyl group or an aryl group; and Ar$^{12}$ represents a naphthylene group, and a hydrogen atom of the naphthylene group in Ar$^{12}$ is optionally substituted by a halogen atom, an alkyl group or an aryl group.

Ar$^{11}$ in the formula (A01) is the same as Ar$^{11}$ in the formula (A1).

Ar$^{12}$ in the formula (A02) is the same as Ar$^{12}$ in the formula (A2).

The aromatic hydroxycarboxylic acid (A01) specifically includes p-hydroxybenzoic acid and m-hydroxybenzoic acid, and p-hydroxybenzoic acid is preferable.

The aromatic hydroxycarboxylic acid (A02) specifically includes 2-hydroxy-6-naphthoic acid, 2-hydroxy-3-naphthoic acid and 1-hydroxy-4-naphthoic acid, and 2-hydroxy-6-naphthoic acid is preferable.

The fatty acid anhydride in the step (i) includes fatty acid anhydrides having 9 or less carbon atoms, and specifically includes acetic anhydride, propionic anhydride, butanoic anhydride, 2-methylpropionic anhydride, pentanoic anhydride, 2,2-dimethylpropionic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, pentane-1,5-dicarboxylic anhydride, maleic anhydride, succinic anhydride and β-bromopropionic anhydride, and acetic anhydride is preferable.

The aromatic hydroxycarboxylic acid in the step (i) may be used singly or in a combination of two or more types thereof.

The amount of the fatty acid anhydride added in the step (i) is preferably more than 1 equivalent, more preferably 1.01 equivalent or more, still more preferably 1.05 equivalent or more and especially preferably more than 1.10 equivalent based on 1 equivalent of phenolic hydroxyl groups of the aromatic hydroxycarboxylic acid.

The amount of the fatty acid anhydride added in the step (i) is preferably 1.35 equivalent or less, preferably 1.30 equivalent or less, more preferably 1.25 equivalent or less and still more preferably 1.20 equivalent or less based on 1 equivalent of phenolic hydroxyl groups of the aromatic hydroxycarboxylic acid.

When the amount of the fatty acid anhydride added in the step (i) is within the above preferable range, Ratio A can be easily controlled to be 0.3 or lower.

For example, the amount of the fatty acid anhydride added in the step (i) is preferably more than 1 equivalent and 1.35 equivalent or less, more preferably 1.01 equivalent or more and 1.30 equivalent or less, still more preferably 1.05 equivalent or more and 1.25 equivalent or less and especially preferably more than 1.10 equivalent and 1.20 equivalent or less based on 1 equivalent of phenolic hydroxyl groups of the aromatic hydroxycarboxylic acid.

The amount of the fatty acid anhydride added in the step (i) may be 1.01 equivalent or more and 1.20 equivalent or less of the fatty acid anhydride based on 1 equivalent of phenolic hydroxyl groups of the aromatic hydroxycarboxylic acid.

While, in conventional processes for producing liquid crystal polyesters, fatty acid anhydrides are normally added so that phenolic hydroxyl groups may become excess based on 1 equivalent of the fatty acid anhydrides, in the process of one embodiment, the fatty acid anhydride is added excessively so that the amount of the fatty acid anhydride added may be more than 1 equivalent based on 1 equivalent of phenolic hydroxyl groups of the aromatic. This point is a different point from the conventional processes.

The step (i) may be carried out in the presence of a heterocyclic organic base compound represented by the formula (N-1) (hereinafter, referred to also as "(N) component").

[Formula 2]

(N-1)

wherein $R^1$ to $R^4$ are each independently a hydrogen atom, an alkyl group having 1 to 4 carbon atoms, a hydroxymethyl group, a cyano group, a cyanoalkyl group whose alkyl group has 1 to 4 carbon atoms, a cyanoalkoxy group whose alkoxy group has 1 to 4 carbon atoms, a carboxy group, an amino group, an aminoalkyl group having 1 to 4 carbon atoms, an aminoalkoxy group having 1 to 4 carbon atoms, a phenyl group, a benzyl group, a phenylpropyl group or a formyl group.

The alkyl group having 1 to 4 carbon atoms in $R^1$ to $R^4$ includes a methyl group, an ethyl group, a propyl group, a butyl group, an isopropyl group and a tert-butyl group.

The cyanoalkyl group in $R^1$ to $R^4$ includes a cyanomethyl group, a cyanoethyl group and a cyanopropyl group.

Examples of the cyanoalkoxy group in $R^1$ to $R^4$ include a cyanomethoxy group, a cyanoethoxy group and a cyanobutoxy group.

Examples of the aminoalkyl group in $R^1$ to $R^4$ include an aminomethyl group, an aminoethyl group and an aminopropyl group.

Examples of the aminoalkoxy group having 1 to 4 carbon atoms include an aminomethoxy group, an aminoethoxy group and an aminobutoxy group.

The (N) component specifically includes imidazole, 1-methylimidazole, 2-methylimidazole, 4-methylimidazole, 1-ethylimidazole, 2-ethylimidazole, 4-ethylimidazole, 1,2-dimethylimidazole, 1,4-dimethylimidazole, 2,4-dimethylimidazole, 1-methyl-2-ethylimidazole, 1-methyl-4-ethylimidazole, 1-ethyl-2-methylimidazole, 1-ethyl-2-ethylimidazole, 1-ethyl-2-phenylimidazole, 2-ethyl-4-methylimidazole, 2-phenylimidazole, 1-benzyl-2-methylimidazole, 2-phenyl-4-methylimidazole, 1-cyanoethyl-2-methylimidazole, 1-cyanoethyl-2-phenylimidazole, 4-cyanoethyl-2-ethyl-4-methylimidazole, 1-aminoethyl-2-methylimidazole, 1-benzyl-2-phenylimidazole, 1-aminoethyl-2-methylimidazole, 1-aminoethyl-2-ethylimidazole, 4-formylimidazole, 2-methyl-4-formylimidazole, 4-methyl-5-formylimidazole, 2-ethyl-4-methyl-5-formylimidazole and 2-phenyl-4-methyl-4-formylimidazole, and from the viewpoint of easy availability and handleability, 1-methylimidazole and 2-methylimidazole are preferable.

The amount of the (N) component added in the step (i) is preferably 15 ppm by mass or more, more preferably 20 ppm by mass or more and preferably 25 ppm by mass or more based on 100 parts by mass of the aromatic hydroxycarboxylic acid used in the step (i).

The amount of the (N) component added in the step (i) is preferably 150 ppm by mass or less, more preferably 120 ppm by mass or less and preferably 100 ppm by mass or less based on 100 parts by mass of the aromatic hydroxycarboxylic acid used in the step (i).

When the amount of the (N) component added in the step (i) is within the above preferable range, Ratio A can be easily controlled to be 0.3 or lower.

For example, the amount of the (N) component added in the step (i) is preferably 15 ppm by mass or more and 150 ppm by mass or less, more preferably 20 ppm by mass or more and 120 ppm by mass or less and preferably 25 ppm by mass or more and 100 ppm by mass or less based on 100 parts by mass of the aromatic hydroxycarboxylic acid used in the step (i).

As a process of adding the (N) component to the reaction system in the step (i), the (N) component may be added to the reaction system after being mixed in a solvent not affecting the reaction and the physical properties. Examples of the solvent include acetic acid.

The acylation reaction in the step (i) is carried out preferably within the temperature range of 130° C. to 150° C. for 30 min to 20 hours, more preferably at 135° C. to 145° C. for 30 min to 3 hours.

[Step (ii)]

The step (ii) is a step of reacting the acylated product obtained in the step (i) with the aromatic hydroxycarboxylic acid and/or with each other to obtain the liquid crystal polyester.

The aromatic hydroxycarboxylic acid includes the same one as the above-mentioned aromatic hydroxycarboxylic acid in the step (i), that is, includes unreacted aromatic hydroxycarboxylic acid.

The step (ii) may be carried out in the presence of the (N) component.

The amount of the (N) component added in the step (ii) is preferably 15 ppm by mass or more, more preferably 20 ppm by mass or more and preferably 25 ppm by mass or more based on 100 parts by mass of the aromatic hydroxycarboxylic acid used in the step (ii).

The amount of the (N) component added in the step (ii) is preferably 150 ppm by mass or less, more preferably 120 ppm by mass or less and preferably 100 ppm by mass or less based on 100 parts by mass of the aromatic hydroxycarboxylic acid used in the step (ii).

When the amount of the (N) component added in the step (ii) is within the above preferable range, Ratio A can be easily controlled to be 0.3 or lower.

For example, the amount of the (N) component added in the step (ii) is preferably 15 ppm by mass or more and 150 ppm by mass or less, more preferably 20 ppm by mass or larger and 120 ppm by mass or less and preferably 25 ppm by mass or larger and 100 ppm by mass or less based on 100 parts by mass of the aromatic hydroxycarboxylic acid used in the step (ii).

As a process of adding the (N) component to the reaction system in the step (ii), (N) component may be added to the reaction system after being mixed in a solvent not affecting the reaction and the physical properties. Examples of the solvent include acetic acid.

With regard to the reaction in the step (ii), it is preferable that the temperature is raised from "120 to 150° C." to "250 to 350° C." at a rate of 0.1 to 5° C./min, and then, with the raised temperature being held, the reaction is carried out for 2 to 5 hours; and it is more preferable that the temperature is raised from "130 to 150° C." to "270 to 330° C." at a rate of 0.1 to 5° C./min, and then, with the raised temperature being held, the reaction is carried out for 2 to 5 hours.

It is preferable that a fatty acid (for example, acetic acid) which is generated as a by-product and unreacted fatty acid anhydride (for example, acetic anhydride) are evaporated out of the system so that the equilibrium may be biased to the formation side of the liquid crystal polyester. By refluxing a part of the distilled fatty acid and returning it to a reactor, raw material monomers and the like evaporating or subliming together with the fatty acid can also be condensed or reversibly sublimed and returned to the reactor.

The steps (i) and (ii) may be carried out in batch systems using batch apparatuses as reactors, or may be carried out in continuous systems using continuous apparatuses as reactors.

In the process for producing the liquid crystal polyester of one embodiment, after the above-mentioned steps (i) and (ii), a step of making a molecular weight of a liquid crystal polyester high may be carried out. Making a molecular weight of a liquid crystal polyester high can be carried out, for example, by cooling a liquid crystal polyester obtained in the step (ii) and crushing it to produce a powdery liquid crystal polyester, and then heating the powdery liquid crystal polyester.

Making a molecular weight of a liquid crystal polyester high may be carried out by granulating the powdery liquid crystal polyester obtained by the cooling and crushing to produce a pelletized liquid crystal polyester, and then heating the pelletized liquid crystal polyester. Making a molecular weight of a liquid crystal polyester high using these methods is referred to as solid phase polymerization in the art.

With regard to the solid phase polymerization reaction, it is preferable that the temperature is raised from "15 to 30° C." to "150 to 250° C." over 30 min to 5 hours, and then raised from the raised temperature to "200 to 300° C." over 5 to 10 hours, and then, with the raised temperature being held, the reaction is carried out for 5 to 15 hours.

According to the above-mentioned process for producing the liquid crystal polyester of one embodiment, the liquid crystal polyester of one embodiment can easily be produced.

(Liquid Crystal Polyester Composition)

A liquid crystal polyester composition of one embodiment may comprise the above-mentioned liquid crystal polyester and a solvent.

<Solvent>

Examples of the solvent in the liquid crystal polyester composition of one embodiment include aliphatic polyhydric alcohols such as glycerol, neopentyl glycol, ethylene glycol, propylene glycol, butanediol, hexylene glycol, polyethylene glycol and polypropylene glycol; halogenated hydrocarbons such as dichloromethane, chloroform, 1,1-dichloroethane, 1,2-dichloroethane, 1,1,2,2-tetrachloroethane, 1-chlorobutane, chlorobenzene and o-dichlorobenzene; halogenated phenols such as p-chlorophenol, pentachlorophenol and pentafluorophenol; ethers such as diethyl ether, di-(2-chloroethyl) ether, tetrahydrofuran and 1,4-dioxane; ketones such as acetone, cyclohexanone and isophorone; esters such as ethyl acetate and butyl lactate; lactone esters such as γ-butyrolactone; carbonates such as ethylene carbonate and propylene carbonate; amines such as triethylamine; nitrogen-containing heterocyclic aromatic compounds such as pyridine; nitriles such as acetonitrile and succinonitrile; amides such as N,N-dimethylformamide, N,N-dimethylacetamide and N-methylpyrrolidone; urea compounds such as tetramethylurea; nitro compounds such as nitromethane and nitrobenzene; sulfur compounds such as dimethyl sulfoxide and sulfolane; and phosphorus compounds such as hexamethylphosphoric acid amide and tri-n-butylphosphoric acid, and they may be used in combination of two or more.

The solvent may be an aprotic solvent.

Examples of the aprotic solvent include the halogenated hydrocarbons, the ethers, the ketones, the esters, the lactone esters, the carbonates, the amines, the nitrogen-containing heterocyclic aromatic compounds, the nitriles, the amides, the urea compounds, the nitro compounds, the sulfur compounds and the phosphorus compounds, and they may be used in combination of two or more.

The solvent is preferably a substance volatilizable in producing films of the liquid crystal polyester.

The liquid crystal polyester composition, in addition to a liquid crystal polyester and solvent, as required, may comprise other components such as fillers, additives and other resins not corresponding to the liquid crystal polyester powder.

Examples of the fillers include inorganic fillers such as silica, alumina, titanium oxide, barium titanate, strontium titanate, aluminum hydroxide and calcium carbonate, and organic fillers such as cured epoxy resins, crosslinked benzoguanamine resins and crosslinked acrylic resins.

Examples of the additives include leveling agents, defoaming agents, antioxidants, ultraviolet absorbents, flame retardants and colorants.

Examples of the other resins other than the liquid crystal polyester include thermoplastic resins other than the liquid crystal polyester, such as polypropylene, polyamide, polyester other than the liquid crystal polyester, polyphenylene sulfide, polyether ketone, polycarbonate, polyether sulfone, polyphenylene ether and modified products thereof, and polyetherimide; elastomers such as copolymers of glycidyl methacrylate with polyethylene; and thermosetting resins such as phenol resins, epoxy resins, polyimide resins and cyanate resins. Other preferable resins include fluororesins. The "fluororesins" means resins containing a fluorine atom(s) in the molecule, and include polymers having a repeating unit containing a fluorine atom(s).

The solid content concentration of the liquid crystal polyester composition is suitably adjusted according to the flowability of the liquid crystal polyester composition and the thickness and the like of articles (specifically, films and the like) produced by using the liquid crystal polyester composition.

(Process for Producing the Liquid Crystal Polyester Composition)

The liquid crystal polyester composition can be obtained by mixing the liquid crystal polyester, the solvent, and as required, other components together in a batch or in a suitable order.

(Film)

FIG. 1 shows a schematic view of a film 10 of one embodiment.

The film 10 comprises a liquid crystal polyester.

The film of one embodiment, since comprising the liquid crystal polyester of one embodiment, is high in the heat resistance.

(Process for Producing the Film)

A process for producing the film of one embodiment comprises a step of melt shaping a liquid crystal polyester to produce the film.

Specifically, a liquid crystal polyester is heated and softened and can be shaped into a desired shape.

A melt shaping method includes an injection molding method, an extrusion method such as a T die method or an inflation method, a compression molding method, a blow molding method, a vacuum forming method and a press forming method.

An inflation method or a T die method is preferable as the melt shaping method.

The process for producing the film of one embodiment, since using the liquid crystal polyester of one embodiment, is suppressed in the generation of gases in producing the film. Therefore, problems such as the gasses adhering and solidifying on a take-up roll of the film and becoming foreign matter in the film hardly occur.

(Circuit Board)

A circuit board of one embodiment comprises the film of one embodiment.

The film, since comprising the liquid crystal polyester of one embodiment, is high in the heat resistance. Then, a liquid crystal polyester is, as compared with other thermoplastic resins, low in the relative dielectric constant and low in the dielectric loss tangent.

In particular, when the film comprises a liquid crystal polyester having one or more kinds of repeating units selected from the group consisting of the repeating unit (A1) and the repeating unit (A2), the heat resistance and the electric characteristics are larger.

Therefore, the film of one embodiment is suitably used as an insulating film of the circuit board.

Specifically, the film of one embodiment is suitably used as an insulating film for high-frequency high-speed circuit boards or the like.

EXAMPLES

Hereinafter, the present disclosure will be described more specifically by Examples, but the present disclosure is not any more limited to the Examples.

[Flow Starting Temperature of the Liquid Crystal Polyester]

First, by using a flow tester ("Model CFT-500EX", manufactured by Shimadzu Corp.), about 2 g of the liquid crystal polyester was filled in a cylinder equipped with a die having a nozzle of 1 mm in inner diameter and 10 mm in length.

Then, a temperature wherein a viscosity of the liquid crystal polyester shows 4,800 Pa·s (48,000 poises) when the liquid crystal polyester was melted while raising the temperature at a rate of 4° C./min under a load of 9.8 MPa (100 kg/cm$^2$) and extruded from the nozzle was measured and defined as a flow starting temperature of the liquid crystal polyester.

[Measurement of the Molecular Weight of the Liquid Crystal Polyester]

By using a gel permeation chromatography multiangle light scattering photometer (differential refractometer (RID-20A, manufactured by Shimadzu Corp.), a multiangle light scattering detector (EOS, manufactured by Wyatt Technology Corp.), columns (Shodex K-G, K-806M (two columns), K-802 (one column) (φ8.0 mm×30 cm), manufactured by Showa Denko K.K.), and a solvent (pentafluorophenol/chloroform (35/65 in weight ratio)), the number-average molecular weight (Mn) and the weight-average molecular weight (Mw) of the liquid crystal polyester were measured.

A sample solution for measurement was prepared by adding 2 mg of a sample (a liquid crystal polyester of each Example) to 1.4 g of pentafluorophenol, dissolving the sample at 80° C. for 2 hours, cooling the resultant to room temperature, then adding 2.6 g of chloroform, further diluting the resultant two-fold with the solvent (pentafluorophenol/chloroform (35/65 in weight ratio)), and then filtering the resultant by using a filter of 0.45 μm in pore size.

[Measurement of the Molar Ratio [Phenolic Hydroxyl Groups/(the Phenolic Hydroxyl Groups+Acyl Groups)] of Phenolic Hydroxyl Groups to the Total Amount of the Phenolic Hydroxyl Groups and Acyl Groups]

(i) By a $^1$H-NMR spectrum obtained under the following measurement condition, a peak area A assigned to hydrogen atoms derived from the acyl group (specifically, acetyl group) of the liquid crystal polyester was calculated.

(ii) By dividing the peak area A by the number of the hydrogen atoms per repeating unit having the acyl group, a relative amount of substance (IntAc) of the acyl groups was calculated.

(iii) By the same $^1$H-NMR spectrum as the spectrum used in (i), a peak area B assigned to hydrogen atoms (aromatic hydrogen atoms) on carbon atoms adjacent to the carbon atom bound to the phenolic hydroxyl group of the liquid crystal polyester was calculated.

(iv) By dividing the peak area B by the number of the hydrogen atoms per repeating unit having the phenolic hydroxyl group, a relative amount of substance (IntOH) of the phenolic hydroxyl groups was calculated.

(v) The molar ratio of phenolic hydroxyl groups to the total amount of the phenolic hydroxyl groups and acyl groups was calculated by (IntOH)/[(IntOH)+(IntAc)] using (IntAc) calculated in (ii) and (IntOH) calculated in (iv).

<Measurement Condition>

NMR apparatus: AVANCE III, manufactured by Bruker Corp.

Magnetic field strength: 14.1 T

Probe: TCI CryoProbe

A sample solution for measurement was prepared by adding 0.5 mL of deuterated pentafluorophenol to 10 mg of a sample, dissolving the sample at 100° C. for 2 hours, and further adding and mixing 0.3 mL of deuterated 1,1,2,2-tetrachloroethane. The NMR measurement was carried out under the following condition.

Measurement method: $^1$H-1D (presaturation method)

Measurement temperature: 30° C.

Number of scans: 64

Waiting time: 4 s

A more specific measurement method is as follows.

By using an obtained $^1$H spectrum, the molar ratio of acetyl groups and hydroxyl groups was obtained by correcting the chemical shift of nearly 8.8 ppm of a signal derived from 2-hydroxy-6-naphthoic acid to 8.85 ppm and making the base line correction, and then dividing an integrated value (peak area) of signals detected on each region by the number of protons per each repeating unit.

A relative molar number (IntAc) of acetyl groups

In the region of 2.66 to 2.45 ppm, there were detected peaks of hydrogen atoms (HA) derived from the acetyl group as indicated in the chemical formulae (A1a) and (A2a). The relative molar number (IntAc) of acetyl groups was calculated by adding values obtained by integrating the peaks detected in this region and dividing the sum by 3 being the number of the hydrogen atoms (HA) of the acetyl group.

[formula 3]

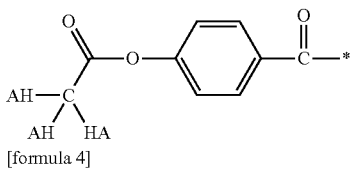
(A1a)

[formula 4]

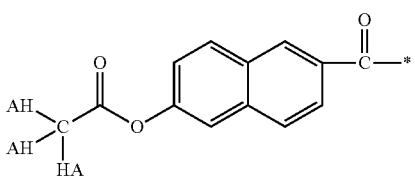
(A2a)

A relative molar number (IntOH-1) of phenolic hydroxyl groups

In the region of 7.15 to 6.95 ppm, there were detected peaks of hydrogen atoms (HB$^1$) on carbon atoms adjacent to the carbon atom bound to the phenolic hydroxyl group as indicated in the chemical formula (A1b). The relative molar number (IntOH-1) of phenolic hydroxyl groups of the repeating unit derived from p-hydroxybenzoic acid was calculated by adding values obtained by integrating the peaks detected in this region and dividing the sum by 2 being the number of the hydrogen atoms (HB$^1$).

[Formula 5]

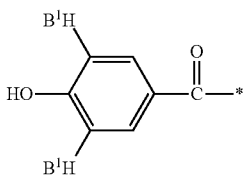
(A1b)

A relative molar number (IntOH-2) of phenolic hydroxyl groups

In the region of 7.25 to 7.35 ppm, there were detected peaks of hydrogen atoms (HB$^2$ and HB$^3$) on carbon atoms adjacent to the carbon atom bound to the phenolic hydroxyl group as indicated in the chemical formula (A2b). The relative molar number (IntOH-2) of phenolic hydroxyl groups of the repeating unit derived from 2-hydroxy-6-naphthoic acid was obtained by integrating the peaks detected in this region and dividing the resultant by 2 being the total number of the hydrogen atoms (HB$^2$ and HB$^3$).

[Formula 6]

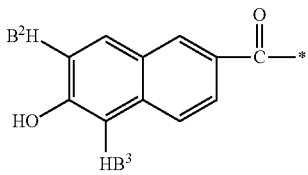
(A2b)

Ratio A of each Example was determined by the expression (1).

Ratio $A=(\text{IntOH-1})+(\text{IntOH-2})/\{(\text{IntAc})+(\text{IntOH-1})+(\text{IntOH-2})\}$ (1)

[Process for Producing a Liquid Crystal Polyester of Example 1]

Into a reactor equipped with a stirrer, a torque meter, a nitrogen gas introduction tube, a thermometer and a reflux condenser were added 1,511.1 g (8.03 mol) of 2-hydroxy-6-naphthoic acid, 410.2 g (2.97 mol) of p-hydroxybenzoic acid, 1,291.4 g (12.65 mol) of acetic anhydride and 0.058 g of 1-methylimidazole. They were stirred at room temperature for 5 min, and then, the temperature was raised under stirring. After the internal temperature reached 140° C., with the temperature of 140° C. being held, stirring was carried out for 1 hour.

Then, while distilling-out acetic acid generated as a by-product and unreacted acetic anhydride were distilled away, the temperature was raised from 140° C. to 275° C. over 3 hours. The temperature was held at 275° C. for 3 hours and 30 min and then, the content was taken out. The content was cooled to room temperature, and crushed by a crusher; thereafter, the temperature was raised from 25° C. to 200° C. over 1 hour, thereafter raised from 200° C. to 250° C. over 8 hours and 20 min, and then held at 250° C. for 10 hours to carry out solid phase polymerization.

An obtained solid-phase polymer was cooled to room temperature to obtain a powdery liquid crystal polyester of Example 1.

The flow starting temperature of the liquid crystal polyester of Example 1 was 299° C.

As a result of observation of the liquid crystal polyester of Example 1 by a polarizing microscope, the liquid crystal polyester exhibited optical anisotropy in melting.

[Process for Producing a Liquid Crystal Polyester of Example 2]

Into a reactor equipped with a stirrer, a torque meter, a nitrogen gas introduction tube, a thermometer and a reflux condenser were added 1,449.0 g (7.7 mol) of 2-hydroxy-6-naphthoic acid, 455.8 g (3.3 mol) of p-hydroxybenzoic acid, 1,291.4 g (12.65 mol) of acetic anhydride and 0.171 g of 1-methylimidazole. They were stirred at room temperature for 5 min, and then, the temperature was raised under stirring. After the internal temperature reached 140° C., with the temperature of 140° C. being held, stirring was carried out for 1 hour.

Then, while distilling-out acetic acid generated as a by-product and unreacted acetic anhydride were distilled away, the temperature was raised from 140° C. to 275° C. over 3 hours. The temperature was held at 275° C. for 3 hours and 30 min and then, the content was taken out. The content was cooled to room temperature, and crushed by a crusher; thereafter, the temperature was raised from 25° C. to 200° C. over 1 hour, thereafter raised from 200° C. to 253° C. over 8 hours and 50 min, and then held at 253° C. for 10 hours to carry out solid phase polymerization.

An obtained solid-phase polymer was cooled to room temperature to obtain a powdery liquid crystal polyester of Example 2.

The flow starting temperature of the liquid crystal polyester of Example 2 was 300° C.

As a result of observation of the liquid crystal polyester of Example 2 by a polarizing microscope, the liquid crystal polyester exhibited optical anisotropy in melting.

[Process for Producing a Liquid Crystal Polyester of Example 3]

Into a reactor equipped with a stirrer, a torque meter, a nitrogen gas introduction tube, a thermometer and a reflux condenser were added 1,552.5 g (8.25 mol) of 2-hydroxy-6-naphthoic acid, 379.8 g (2.75 mol) of p-hydroxybenzoic acid, 1,291.4 g (12.65 mol) of acetic anhydride and 0.097 g of 1-methylimidazole. They were stirred at room temperature for 5 min, and then, the temperature was raised under stirring. After the internal temperature reached 140° C., with the temperature of 140° C. being held, stirring was carried out for 1 hour.

Then, while distilling-out acetic acid generated as a by-product and unreacted acetic anhydride were distilled away, the temperature was raised from 140° C. to 275° C. over 3 hours. The temperature was held at 275° C. for 3 hours and 30 min and then, the content was taken out. The content was cooled to room temperature, and crushed by a crusher; thereafter, the temperature was raised from 25° C. to 200° C. over 1 hour, thereafter raised from 200° C. to 250° C. over 8 hours and 20 min, and then held at 250° C. for 10 hours to carry out solid phase polymerization.

An obtained solid-phase polymer was cooled to room temperature to obtain a powdery liquid crystal polyester of Example 3.

The flow starting temperature of the liquid crystal polyester of Example 3 was 303° C.

As a result of observation of the liquid crystal polyester of Example 3 by a polarizing microscope, the liquid crystal polyester exhibited optical anisotropy in melting.

[Process for Producing a Liquid Crystal Polyester of Example 4]

Into a reactor equipped with a stirrer, a torque meter, a nitrogen gas introduction tube, a thermometer and a reflux condenser were added 1,242.0 g (6.6 mol) of 2-hydroxy-6-naphthoic acid, 607.7 g (4.4 mol) of p-hydroxybenzoic acid, 1,291.4 g (12.65 mol) of acetic anhydride and 0.129 g of 1-methylimidazole. They were stirred at room temperature for 5 min, and then, the temperature was raised under stirring. After the internal temperature reached 140° C., with the temperature of 140° C. being held, stirring was carried out for 1 hour.

Then, while distilling-out acetic acid generated as a by-product and unreacted acetic anhydride were distilled away, the temperature was raised from 140° C. to 320° C. over 3 hours. When the torque reached a predetermined one, the reaction was finished and the content was taken out. The content was cooled to room temperature, and crushed by a crusher; thereafter, the temperature was raised from 25° C. to 200° C. over 1 hour, thereafter raised from 200° C. to 250° C. over 8 hours and 20 min, and then held at 250° C. for 10 hours to carry out solid phase polymerization.

An obtained solid-phase polymer was cooled to room temperature to obtain a powdery liquid crystal polyester of Example 4.

The flow starting temperature of the liquid crystal polyester of Example 4 was 291° C.

As a result of observation of the liquid crystal polyester of Example 4 by a polarizing microscope, the liquid crystal polyester exhibited optical anisotropy in melting.

[Process for Producing a Liquid Crystal Polyester of Comparative Example 1]

Into a reactor equipped with a stirrer, a torque meter, a nitrogen gas introduction tube, a thermometer and a reflux condenser were added 1,449.0 g (7.7 mol) of 2-hydroxy-6-naphthoic acid, 455.8 g (3.3 mol) of p-hydroxybenzoic acid and 1,235.5 g (12.1 mol) of acetic anhydride. They were stirred at room temperature for 5 min, and thereafter, the temperature was raised under stirring. After the internal temperature reached 140° C., with the temperature of 140° C. being held, stirring was carried out for 1 hour.

Then, while distilling-out acetic acid generated as a by-product and unreacted acetic anhydride were distilled away, the temperature was raised from 140° C. to 320° C. over 3 hours. When the torque reached a predetermined one, the reaction was finished and the content was taken out. The content was cooled to room temperature, and crushed by a crusher; thereafter, the temperature was raised from 25° C. to 200° C. over 1 hour, thereafter raised from 200° C. to 250° C. over 8 hours and 20 min, and then held at 250° C. for 10 hours to carry out solid phase polymerization.

An obtained solid-phase polymer was cooled to room temperature to obtain a powdery liquid crystal polyester of Comparative Example 1.

The flow starting temperature of the liquid crystal polyester of Comparative Example 1 was 302° C.

As a result of observation of the liquid crystal polyester of Comparative Example 1 by a polarizing microscope, the liquid crystal polyester exhibited optical anisotropy in melting.

[Process for Producing a Liquid Crystal Polyester of Comparative Example 2]

Into a reactor equipped with a stirrer, a torque meter, a nitrogen gas introduction tube, a thermometer and a reflux condenser were added 1,449.0 g (7.7 mol) of 2-hydroxy-6-naphthoic acid, 455.8 g (3.3 mol) of p-hydroxybenzoic acid and 1,235.5 g (12.1 mol) of acetic anhydride. They were stirred at room temperature for 5 min, and then, the temperature was raised under stirring. After the internal temperature reached 140° C., with the temperature of 140° C. being held, stirring was carried out for 1 hour.

Then, while distilling-out acetic acid generated as a by-product and unreacted acetic anhydride were distilled away, the temperature was raised from 140° C. to 275° C. over 3 hours. The temperature was held at 275° C. for 3 hours and 30 min and then, the content was taken out. The content was cooled to room temperature, and crushed by a crusher; thereafter, the temperature was raised from 25° C. to 200° C. over 1 hour, thereafter raised from 200° C. to 255° C. over 9 hours and 10 min, and then held at 255° C. for 10 hours to carry out solid phase polymerization.

An obtained solid-phase polymer was cooled to room temperature to obtain a powdery liquid crystal polyester of Comparative Example 2.

The flow starting temperature of the liquid crystal polyester of Comparative Example 2 was 292° C.

As a result of observation of the liquid crystal polyester of Comparative Example 2 by a polarizing microscope, the liquid crystal polyester exhibited optical anisotropy in melting.

In Table 1, there are shown the used amounts (% by mol) of raw material monomers of the liquid crystal polyester of each Example, the acetic anhydride ratio and the addition amount of the 1-methylimidazole.

In Table 1, there are also shown a molar ratio [phenolic hydroxyl groups/(the phenolic hydroxyl groups+acyl groups)] and the molecular weight of the liquid crystal polyester of each Example.

The used amounts of raw material monomers are indicated as blend proportions (% by mol) of 2-hydroxy-6-naphthoic acid and p-hydroxybenzoic acid.

The acetic anhydride ratio is a ratio of an equivalent weight of acetic anhydride based on 1 equivalent of phenolic hydroxyl groups of 2-hydroxy-6-naphthoic acid and p-hydroxybenzoic acid.

The addition amount of 1-methyimidazole is an amount (ppm by mass) of 1-methylimidazole added based on 100 parts by mass of the total amount of 2-hydroxy-6-naphthoic acid and p-hydroxybenzoic acid.

TABLE 1

|  |  | Example 1 | Example 2 | Example 3 | Example 4 | Comparative Example 1 | Comparative Example 2 |
|---|---|---|---|---|---|---|---|
| 2-hydroxy-6-naphthoic acid | (mol %) | 73 | 70 | 75 | 60 | 70 | 70 |
| p-hydroxybenzoic acid | (mol %) | 27 | 30 | 25 | 40 | 30 | 30 |
| Acetic anhydride ratio |  | 1.15 | 1.15 | 1.15 | 1.15 | 1.10 | 1.10 |
| 1-methyimidazole | (ppm by mass) | 30 | 90 | 50 | 70 | — | — |
| Amount of phenolic hydroxyl groups |  | 0.00025 | 0.00075 | 0.00045 | 0.00100 | 0.00120 | 0.00160 |
| Amount of acetyl groups |  | 0.00310 | 0.00250 | 0.00300 | 0.00333 | 0.00227 | 0.00203 |
| a molar ratio [phenolic hydroxyl groups/(the phenolic hydroxyl groups + acetyl groups)] |  | 0.075 | 0.231 | 0.130 | 0.231 | 0.346 | 0.440 |
| Molecular weight | (Mn) | 33000 | 45000 | 32000 | 170000 | 61000 | 39000 |
|  | (Mw) | 150000 | 170000 | 120000 | 650000 | 180000 | 190000 |
|  | (Mw/Mn) | 4.7 | 3.9 | 3.9 | 3.8 | 3.0 | 4.9 |

<Evaluation of the Heat Resistance>
[Measurement of the Weight Loss temperature]

A thermogravimetric analysis was carried out by using a thermogravimetric analyzer (DTG-50, manufactured by Shimadzu Corp.), under an air atmosphere in the condition of a start temperature of 30° C., an end temperature of 800° C. and a temperature rise rate of 10° C./min; with the % by weight at 100° C. of the liquid crystal polyester of each Example being taken as 100%, the temperature at which the % by weight of the liquid crystal polyester of the each Example reached 99.9% by temperature rising was taken as a 0.1%-weight loss temperature; and the temperature at which the % by weight of the sample of the each Example reached 99.0% was taken as a 1%-weight loss temperature.

The results are shown in Table 2.

TABLE 2

|  |  | Example 1 | Example 2 | Example 3 | Example 4 | Comparative Example 1 | Comparative Example 2 |
|---|---|---|---|---|---|---|---|
| weight loss temperature (° C.) | 0.10 wt % | 313 | 215 | 319 | 268 | 129 | 166 |
|  | 1.0 wt % | 442 | 443 | 443 | 470 | 428 | 424 |

Table 2 confirmed that the liquid crystal polyesters of the Examples were high in the weight loss temperature as compared with the liquid crystal polyesters of the Comparative Examples. That is, it has been found that the liquid crystal polyesters of the Examples were less in the amount of gasses generated in the temperature rising as compared with the liquid crystal polyesters of the Comparative Examples.

From the above, it has been confirmed that the heat resistance of the liquid crystal polyester of one embodiment was enhanced.

What is claimed is:

1. A liquid crystal polyester comprising a repeating unit derived from an aromatic hydroxycarboxylic acid,
    wherein the content of the repeating unit derived from an aromatic hydroxycarboxylic acid is 80% or more based on 100% of a total number of all repeating units of the liquid crystal polyester,
    the repeating unit derived from an aromatic hydroxycarboxylic acid comprises a repeating unit (A1) represented by the formula (A1) and a repeating unit (A2) represented by the formula (A2),
    a ratio between the number of the repeating unit (A2) and the number of the repeating unit (A1) [repeating unit (A2)/repeating unit (A1)] is 1.2 or larger and a molar ratio of phenolic hydroxyl groups to the total amount of the phenolic hydroxyl groups and acetyl groups [phenolic hydroxyl groups/(the phenolic hydroxyl groups+acetyl groups)] is 0.3 or lower, as calculated by 1H-NMR,

$$—O—Ar^{11}—CO— \quad (A1)$$

$$—O—Ar^{12}—CO— \quad (A2)$$

wherein $Ar^{11}$ represents a phenylene group, and a hydrogen atom in the phenylene group in $Ar^{11}$ is optionally substituted by a halogen atom, an alkyl group or an aryl group; and $Ar^{12}$ represents a naphthylene group, and a hydrogen atom in the naphthylene group in $Ar^{12}$ is optionally substituted by a halogen atom, an alkyl group or an aryl group.

2. The liquid crystal polyester according to claim 1, wherein $Ar^{11}$ in the formula (A1) is a 1,4-phenylene group, and $Ar^{12}$ in the formula (A2) is a 2,6-naphthylene group.

3. The liquid crystal polyester according to claim 1, wherein the liquid crystal polyester has a weight-average molecular weight of 100,000 to 800,000.

4. The liquid crystal polyester according to claim 1, wherein the liquid crystal polyester has Mw/Mn of 2.0 to 6.0, wherein Mw is a weight-average molecular weight of the liquid crystal polyester and Mn is a number-average molecular weight of the liquid crystal polyester.

5. A liquid crystal polyester composition comprising the liquid crystal polyester according to claim 1 and a solvent.

6. A film comprising the liquid crystal polyester according to claim 1.

7. A circuit board comprising the film according to claim 6.

8. The liquid crystal polyester according to claim 1, wherein the liquid crystal polyester has Mw/Mn of 3.0 to 6.0, wherein Mw is a weight-average molecular weight of the liquid crystal polyester and Mn is a number-average molecular weight of the liquid crystal polyester.

9. The liquid crystal polyester according to claim 1, wherein the liquid crystal polyester has Mw/Mn of 3.5 to 6.0, wherein Mw is a weight-average molecular weight of the liquid crystal polyester and Mn is a number-average molecular weight of the liquid crystal polyester.

10. The liquid crystal polyester according to claim 1, wherein the liquid crystal polyester has Mw/Mn of 3.5 to 4.0, wherein Mw is a weight-average molecular weight of the liquid crystal polyester and Mn is a number-average molecular weight of the liquid crystal polyester.

11. The liquid crystal polyester according to claim 1, wherein the molar ratio of phenolic hydroxyl groups to the total amount of the phenolic hydroxyl groups and acetyl groups is 0.28 or lower.

12. The liquid crystal polyester according to claim 1, wherein the molar ratio of phenolic hydroxyl groups to the total amount of the phenolic hydroxyl groups and acetyl groups is 0.26 or lower.

13. The liquid crystal polyester according to claim 1, wherein the molar ratio of phenolic hydroxyl groups to the total amount of the phenolic hydroxyl groups and acetyl groups is 0.24 or lower.

14. The liquid crystal polyester according to claim 1, wherein the liquid crystal polyester has a weight-average molecular weight of 110,000 to 750,000.

15. The liquid crystal polyester according to claim 1, wherein the liquid crystal polyester has a weight-average molecular weight of 600,000 to 700,000.

16. The liquid crystal polyester according to claim 1, wherein the liquid crystal polyester has a weight-average molecular weight of 110,000 to 750,000, the liquid crystal polyester has Mw/Mn of 3.5 to 5.0, wherein Mw is the weight-average molecular weight of the liquid crystal polyester and Mn is a number-average molecular weight of the liquid crystal polyester and the molar ratio of phenolic hydroxyl groups to the total amount of the phenolic hydroxyl groups and acetyl groups is 0.24 or lower.

17. The liquid crystal polyester according to claim 1, wherein the liquid crystal polyester has a weight-average molecular weight of 600,000 to 70,000, the liquid crystal polyester has Mw/Mn of 3.5 to 4.0, wherein Mw is the weight-average molecular weight of the liquid crystal polyester and Mn is a number-average molecular weight of the liquid crystal polyester and the molar ratio of phenolic hydroxyl groups to the total amount of the phenolic hydroxyl groups and acetyl groups is 0.24 or lower.

18. A process for producing a film comprising a step of melt forming the liquid crystal polyester according to claim 1 to produce the film.

19. The process for producing a film according to claim 18, wherein an inflation method or a T die method is used in the step of melt forming to produce the film.

\* \* \* \* \*